(12) United States Patent
Lacy et al.

(10) Patent No.: US 6,414,211 B1
(45) Date of Patent: Jul. 2, 2002

(54) METHOD OF PACKING A NUCLEAR REACTOR VESSEL FOR DECOMMISSIONING AND REMOVAL

(75) Inventors: Norman H. Lacy, Andover, NJ (US); Robert D. Morgan, Suffern; Zdeneck Z. Studnicka, Spring Valley, both of NY (US)

(73) Assignee: Burns & Roe Enterprises, Inc., Oradell, NJ (US)

( * ) Notice: Subject to any disclaimer, the term of this patent is extended or adjusted under 35 U.S.C. 154(b) by 49 days.

(21) Appl. No.: 09/591,470

(22) Filed: Jun. 9, 2000

(51) Int. Cl.[7] .................................................. G21F 5/00
(52) U.S. Cl. ........................................ 588/3; 588/249
(58) Field of Search ................................. 588/1, 3, 249; 250/506.1, 505.1, 515.1; 376/260; 976/DIG. 393

(56) References Cited

U.S. PATENT DOCUMENTS 3,710,857 A * 1/1973 Meyer et al. ............... 165/169
6,087,546 A * 7/2000 Griffiths et al. ................ 588/3

OTHER PUBLICATIONS

United States General Accounting Office Report to Congressional Requesters, *Nuclear Research and Development: Shippingport Decommissioning—How Applicable Are the Lessons Learned?*, (Sep. 1990).

*Proposal to Portland General Electric Company: Reactor Vessel and Internals Removal Project—revs. 1–3* (Sep. 26, 1996; Dec. 19, 1996; and Mar. 20, 1997).

*Conceptual Design Study—Reactor Pressure Vessel Package Drop Scenarios—Revision 0* (Dec. 9, 1996).

*Portland General Electric Company Trojan Reactor Vessel Package—Safety Analysis Report* (Sep. 23, 1998).

Radwaste Magazine, *Cruisin' Up the River —The Final Journey of the Trojan Reactor Vessel* (Nov./Dec. 1999), pp. 48–53.

Engineering News Record, *Reactor Shipped To Dump As Unit* (Aug. 2, 1999), p. 15.

Norman H. Lacy, *Burns and Roe Large, One–Piece Nuclear Reactor Shielding Process* (Nov. 1999).

American Nuclear Society Transactions, *1999 Winter Meeting* (Nov. 14–18, 1999), pp. 29–31.

* cited by examiner

*Primary Examiner*—Steven P. Griffin
*Assistant Examiner*—Eileen E. Nave
(74) *Attorney, Agent, or Firm*—Robert D. Katz; Cooper & Dunham LLP

(57) ABSTRACT

A method of packaging a nuclear reactor vessel for decommissioning and removal, wherein closure plates are installed onto the vessel, concrete is injected into the vessel, shielding material is installed around the exterior of the vessel and the main nozzles of the vessel, the installed shielding materials are welded to themselves, the vessel is placed on shipping cradles and attached to longitudinal restraint mechanisms for transport.

14 Claims, 7 Drawing Sheets

METHOD OF PACKING A NUCLEAR REACTOR VESSEL FOR DECOMMISSIONING AND REMOVAL

FIELD OF THE INVENTION

This invention relates to a method of packaging a nuclear reactor vessel for decommissioning and removal, and more particularly, to a method wherein low density concrete (in a wet mixture) is injected into the vessel and external radiation shielding of different thicknesses is mechanically attached to the vessel and then welded to itself to reduce the cost of removal of a reactor vessel.

BACKGROUND OF THE INVENTION

Various methods for disposing of nuclear reactor pressure vessels ("RPV's") exist. As described in *American Nuclear Society Transactions*, (November 1999), RPV's may be disposed of by segmenting the RPV into small pieces and placing the pieces into liners and shielded casks for transport to disposal sites or by placing an entire RPV inside a shielded transport cask.

These methods are extremely costly and are not always suited for the disposal of large full-size (>900 MW(electric)) RPV's. For example, the known methods may result in high fabrication and transportation costs, high grouting, shielding and burial site disposal volumes, and often high worker radiation doses.

It is therefore an object of the present invention to provide a method of packaging a nuclear reactor vessel for decommissioning and removal which reduces cost and which can be implemented on large full-size RPV's without incurring the foregoing disadvantages.

SUMMARY OF THE INVENTION

The object of the invention can be attained and the disadvantages of the prior methods can be overcome by providing a method of packaging a nuclear reactor vessel for decommissioning and removal, including the steps of: installing reactor vessel permanent closure plates onto the vessel; injecting concrete into the vessel; installing a first ring of shielding material around the main nozzles of the vessel; enclosing the vessel core area with a second shielding ring; welding longitudinal seams of the first shielding ring; welding longitudinal seams of the second shielding ring; welding the second shielding ring to the first shielding ring; placing the vessel on shipping cradles; and tightening a longitudinal restraint mechanism to the vessel. The method can also include the step of installing impact limiters on each end of the vessel.

The concrete injected into the vessel can be wet, low density cellular concrete or the like with a density between 0.721 g/cm$^3$ to 1.041 g/cm$^3$ and can be prepared with foaming agents and curing additives on the site where the decommissioning is to take place. The concrete is allowed to harden prior to final closure and sealing of all the reactor openings.

The method of packaging the nuclear reactor vessel also includes the step of circulating air into the vessel to remove heat from inside the vessel, which is performed prior to the step of injecting concrete into the vessel. In addition, prior to installing the first shielding ring, the method of packaging a nuclear reactor vessel for decommissioning and removal can include the steps of: allowing the vessel to vent and cool; removing temporary closure plates; verifying that the vessel includes a requisite amount of the concrete; verifying that there are no empty spaces in the vessel; and confirming that no free standing water is in the vessel.

The first and second shielding rings can preferably be of steel, or the like, and in a preferred embodiment have respective thicknesses sized to provide the requisite amount of radiation shielding. The second shielding ring can be applied to the vessel by lowering the vessel into the second shielding ring and mechanically fastening the second shielding ring to the vessel. The closure plates are preferably made of steel and can be welded to the vessel.

BRIEF DESCRIPTION OF THE DRAWINGS

The features and advantages of the invention will become apparent upon review of the following detailed description of preferred embodiments, taken in conjunction with the following drawings, in which.

DETAILED DESCRIPTION OF THE PREFERRED EMBODIMENTS

Figure 1:
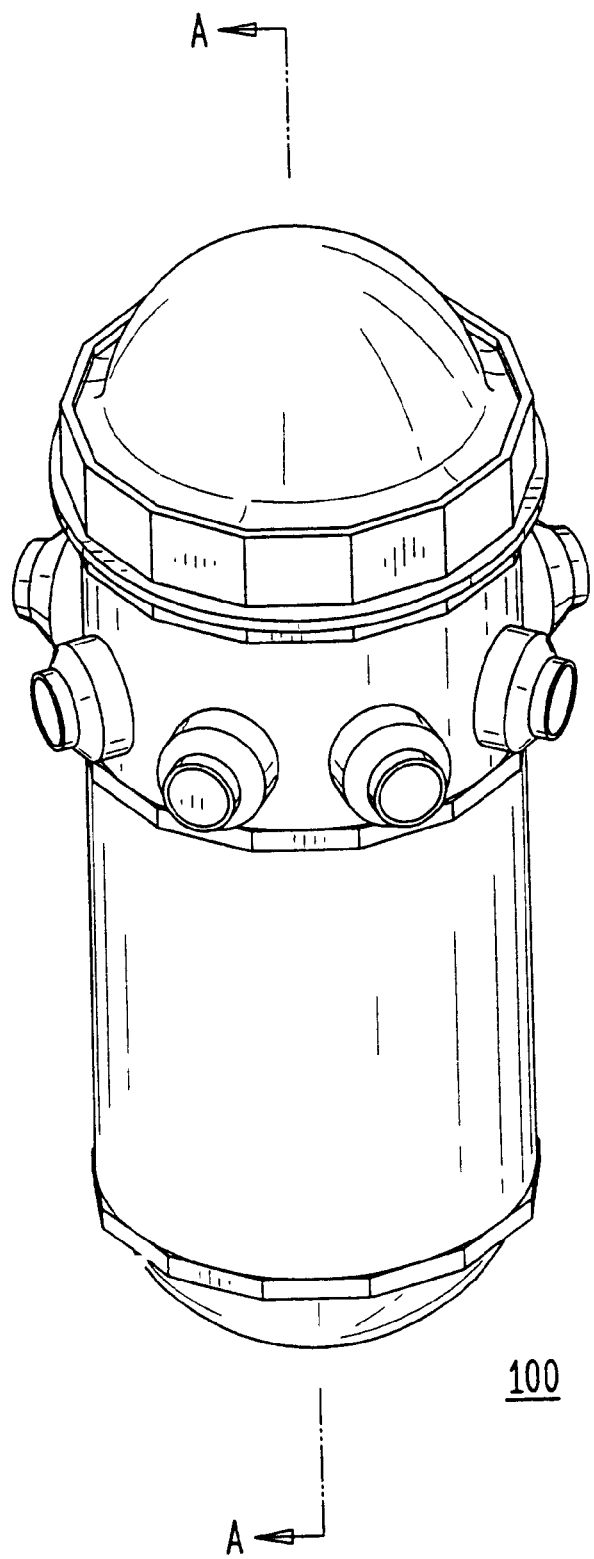
FIG. 1 is a perspective view of an example of a reactor pressure vessel which is to be dismantled and removed according to an embodiment of the present invention.
Figure 2:
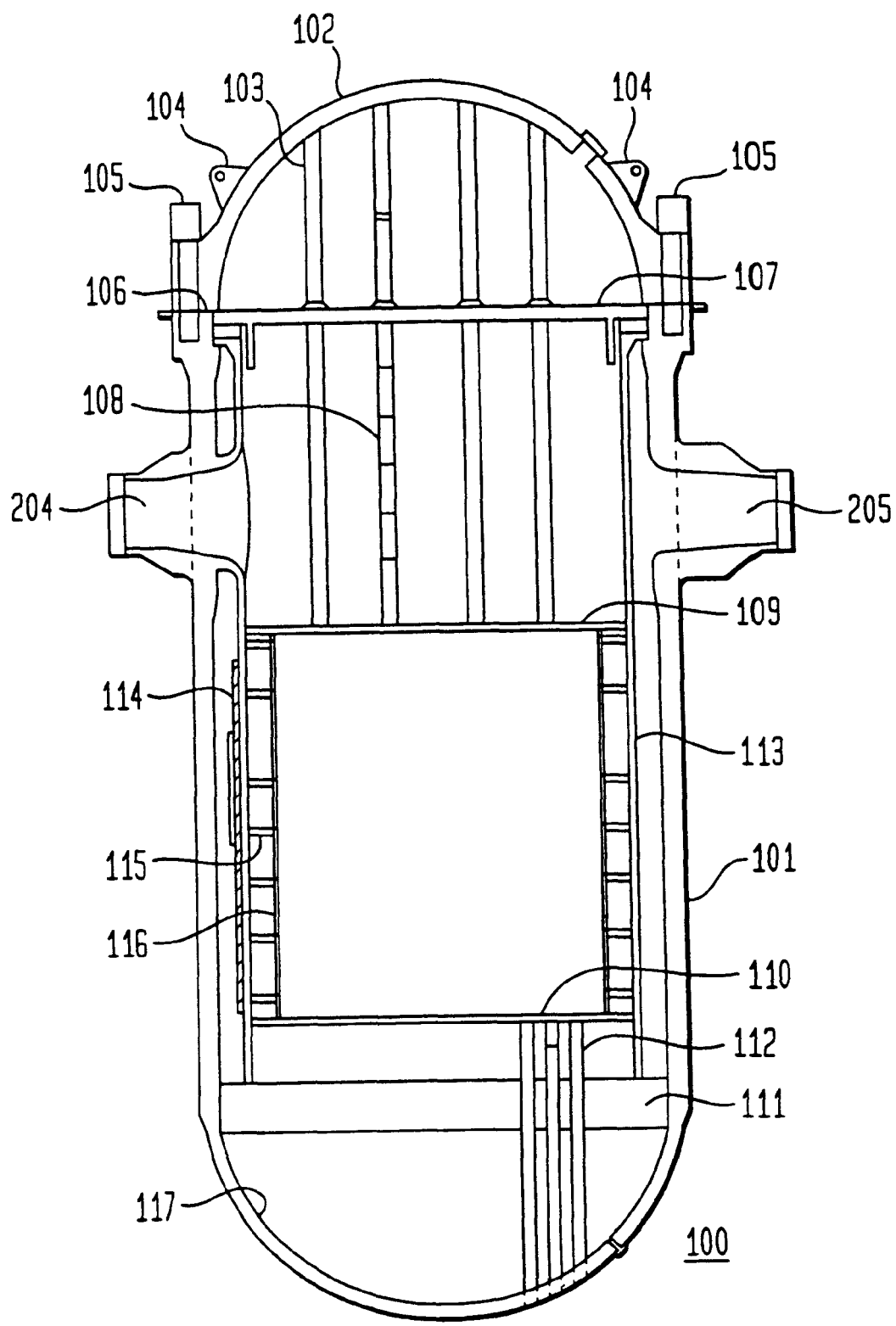
FIG. 2 is a cross-sectional view of a reactor pressure vessel taken along line A—A of FIG. 1.

As shown in FIGS. 1 and 2, an exemplary RPV 100 is ellipsoid in shape and includes a vessel shell 101, an upper head 102, an upper instrumentation and support assembly 103, a pair of lifting lugs 104, a pair of head studs 105, O-ring seals 106, an upper support plate 107, control rod guide tubes 108, an upper core plate 109, a lower core plate 110, a lower core support plate 111, a lower core support column 112, a core barrel 113, neutron shield pads 114, former plates 115, core baffle plates 116 and an interior surface 117 which is usually clad with a thin stainless steel liner.

Figure 3:
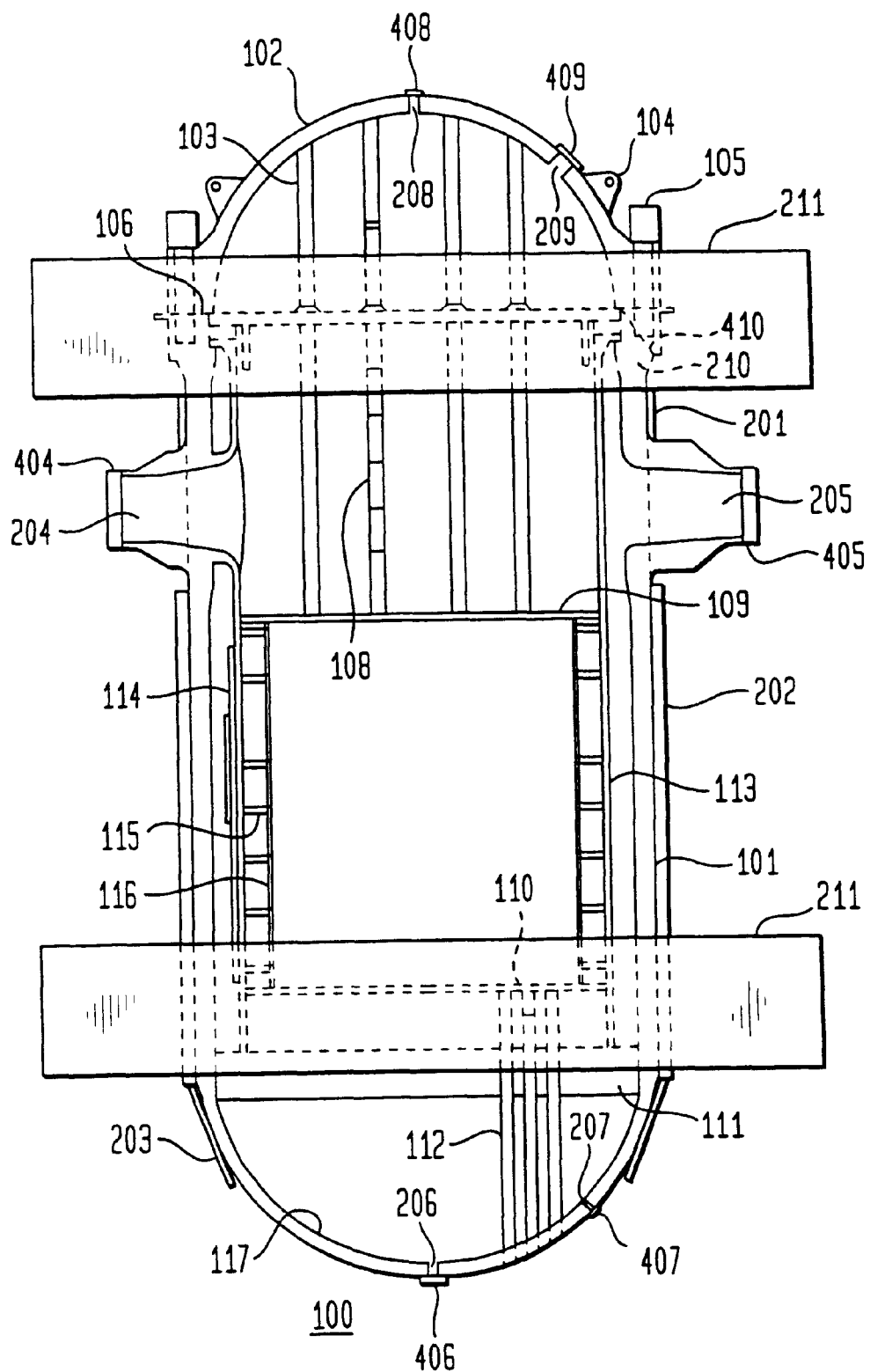
FIG. 3 is a cross-sectional view of a reactor pressure vessel taken along line A—A of FIG. 1 and prepared according to an embodiment of the present invention.
Figure 4:
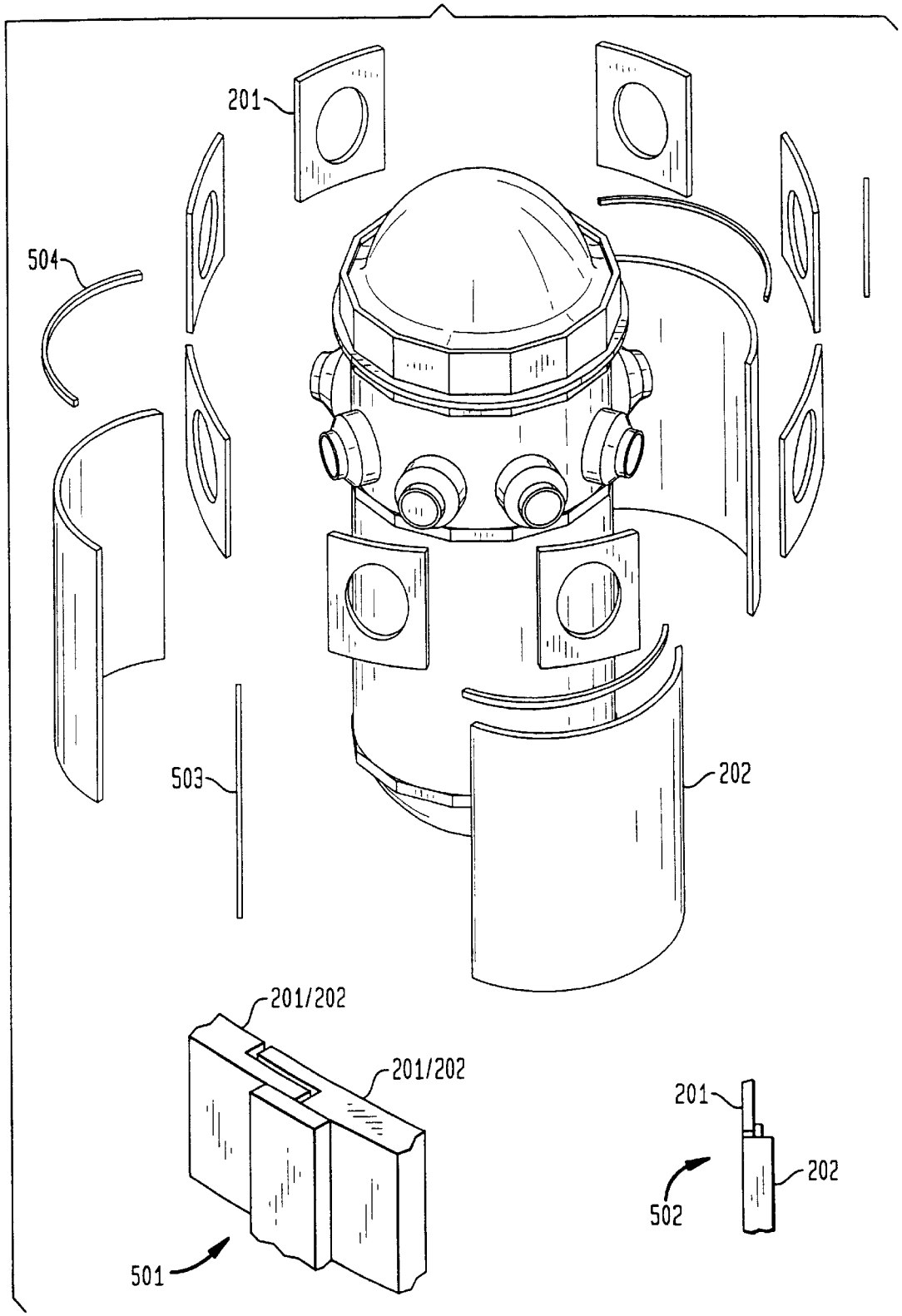
FIG. 4 is a schematic view of reactor pressure vessel shielding details according to an embodiment of the present invention.
Figure 7:
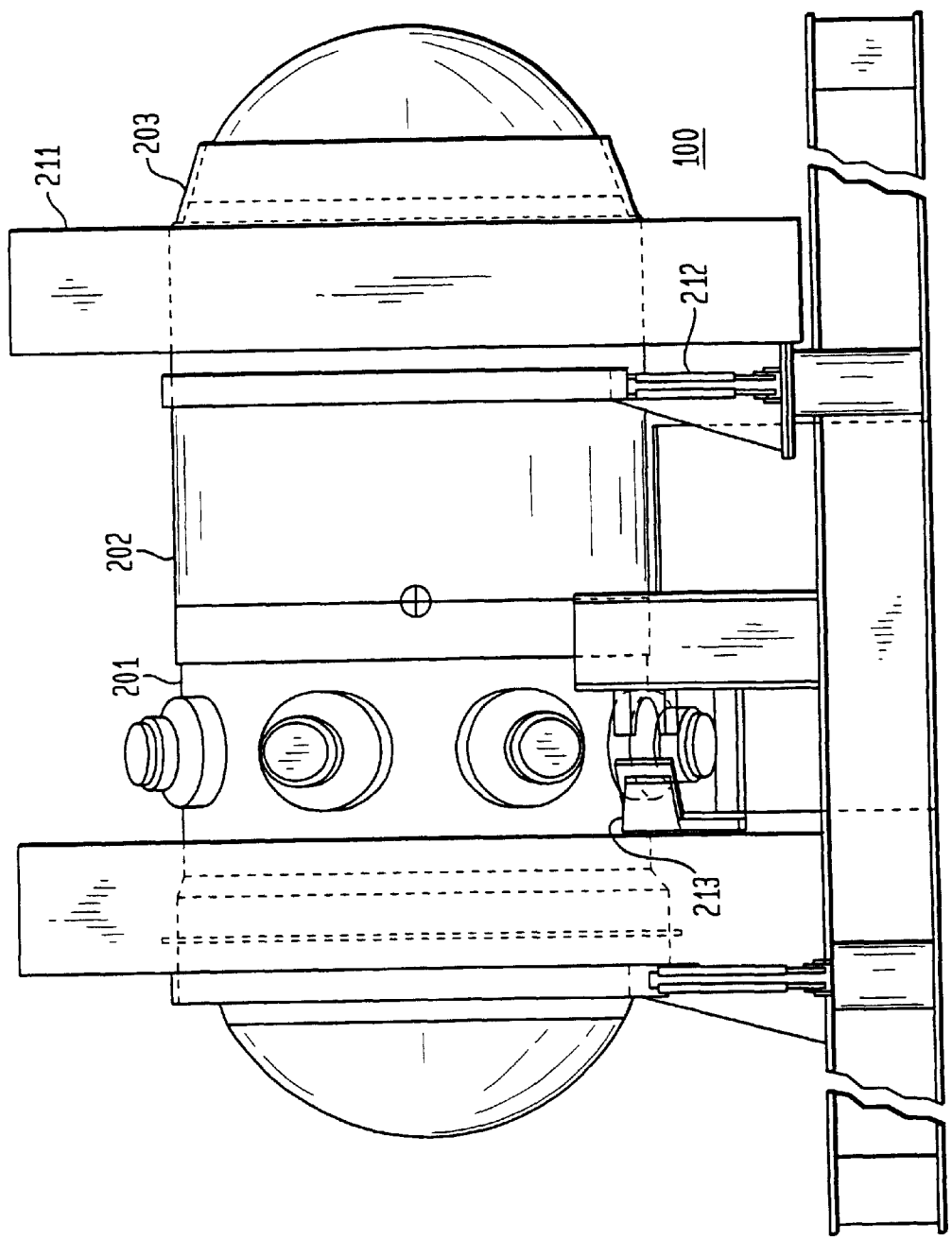
FIG. 7 is a schematic view of the reactor pressure vessel reactor pressure vessel of FIG. 1 on its side and resting in its shipping cradles.

FIGS. 3, 4 and 7 show an RPV 100 that has been prepared for decommissioning and removal according to the method of the present invention by attachment of shielding plates. The RPV 100 is clad with a two inch thick shield plate 201 surrounding the upper portion of the vessel shell 101 around the outlet and inlet nozzles 204, 205, a five inch thick shield plate 202 surrounding the middle portion or core area of the vessel shell 101, a one inch thick shield plate 203 around the lower portion of the shell 101 (beneath the lower core support plate 111), outlet nozzles 204, inlet nozzles 205, a drain 206, incore penetrations 207, a head vent 208, Control Rod Drive Mechanism ("CRDM") penetrations 209, flange monitoring tubes 210, a transport cradle 212 and longitudinal restraint jaws 213 which are tightened to hold the RPV 100 in place during transport. Impact limiters 211 can be installed on each end of the RPV 100 to prevent knocking or bumping of the RPV 100 during transport.

Figure 6:
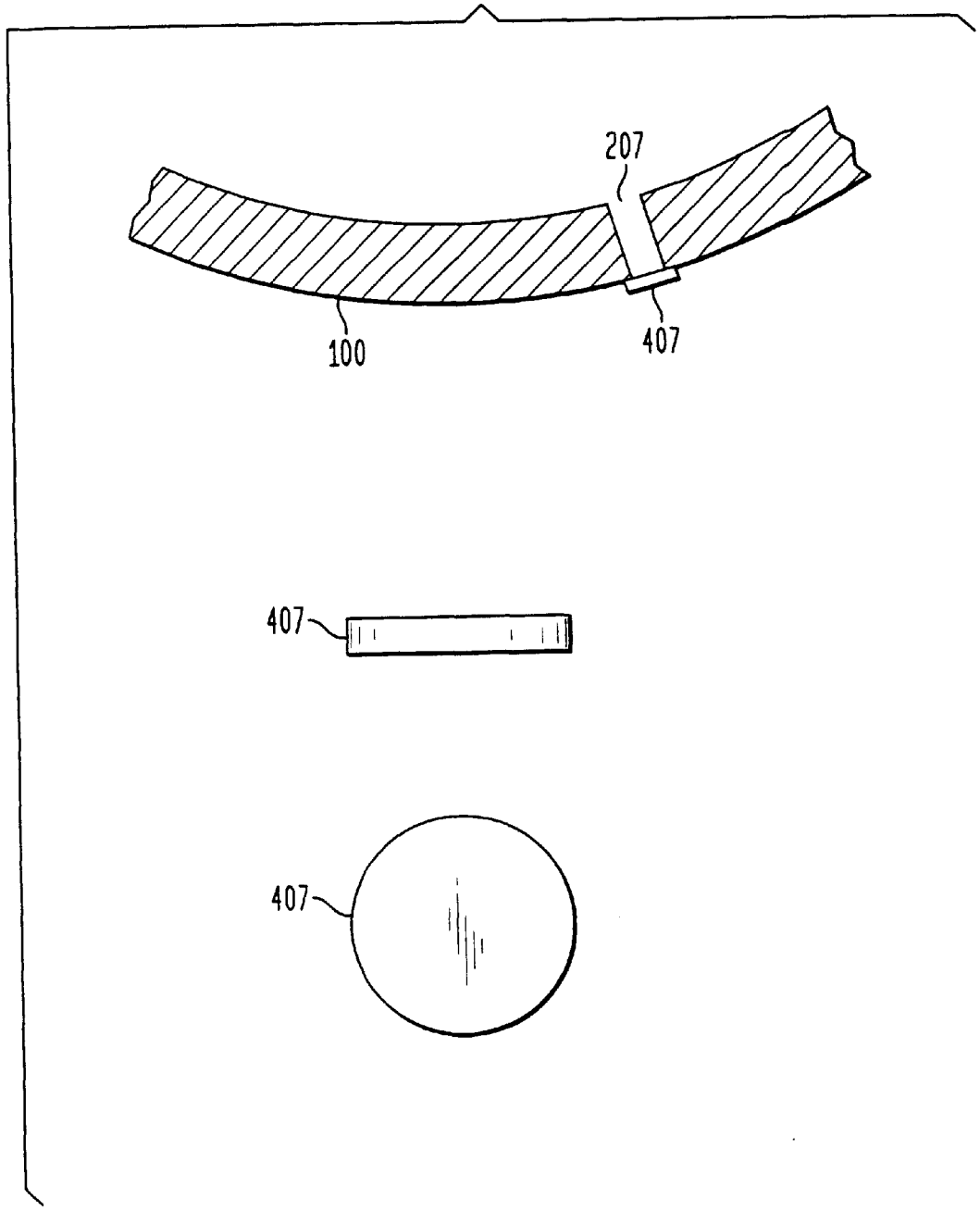
FIG. 6 is a schematic view of an incore closure plate.

As shown in FIGS. 3 and 6, outlet and inlet nozzles 204, 205 are covered by respective closure plates 404 and 405. Similarly, a drain opening is covered by a closure plate 406, an incore opening 207 is covered by a closure plate 407, a head vent opening 208 is covered by a closure plate 408, a CRDM opening 209 is covered by a closure plate 409 and a flange monitoring tube 210 is covered by a closure plate 410. The closure plate material can be ASME SA-240, Type 304L, ASME SA-516 GR. 70, or any suitable alloy providing requisite radiation shielding and welding characteristics. The closure plates 404–410 are welded to the RPV 100 so that the closure plates 404–410 cover their respective openings 204–210.

FIG. 4 provides details of shielding on an RPV 100 and illustrates typical longitudinal seam welds 501 between each respective two inch thick shield plate 201 or between each respective five inch thick shield plate 202 and circumferential seam welds 502 between a two inch thick shield plate 201 and a five inch thick shield plate 202. FIG. 4 also illustrates typical longitudinal seam closure plates 503 and typical circumferential seam closure plates 504. Longitudinal seam welds that do not use the closure plates 503 are also used on some of the seams.

Figure 5:
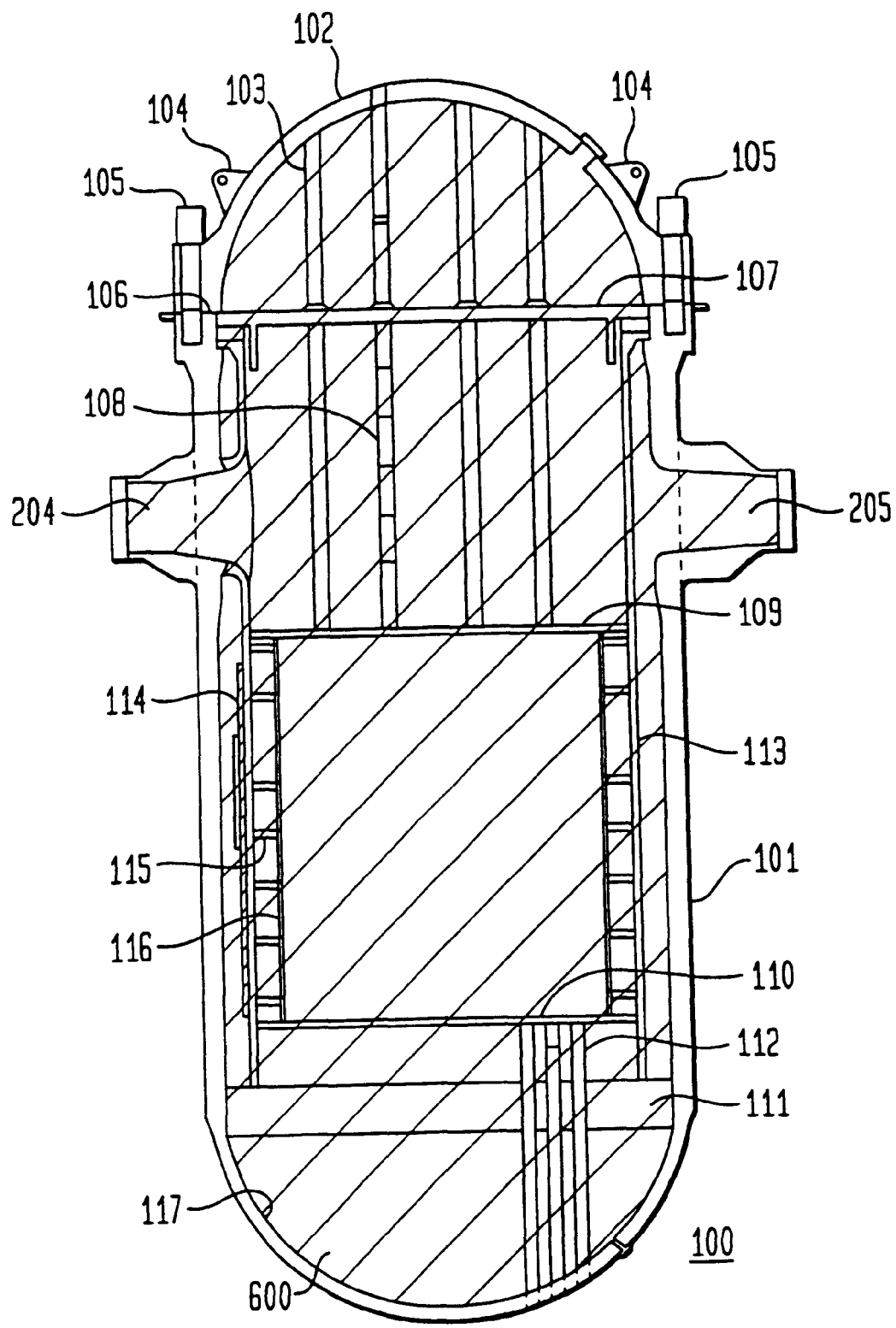
FIG. 5 is a cross-sectional view of a reactor pressure vessel taken along line A—A of FIG. 1 containing low density cellular concrete according to an embodiment of the present invention

FIG. 5 shows a cross section of the RPV 100 housing Low-Density Cellular Concrete (LDCC) 600. The void space inside the RPV 100 should be limited to <15% of the total volume of the RPV 100. LDCC 600 is used to fill the RPV 100. LDCC 600 is a heterogeneous mixture of organic surfactants/admixtures, portland cement, water and air and is sensitive to overpressurization. For an approximately 42 foot RPV 100, 130 megagrams (Mg) of 10° C. liquid LDCC 600 can be injected into the drained RPV 100 (weighing ~907 Mg) still positioned in the vertical position.

Due to the high internal metal temperature, caused by component decay heat of the reactor vessel, compensating action should be taken to cool the inside of the RPV 100 prior to injection of the LDCC 600 into the vessel. A grout chiller system circulates air from outside the containment region into the RPV 100 to remove heat from the inside of the RPV 100. Before exiting the containment region, exhaust air passes through a cooling coil, high efficiency particulate air (HEPA) filters, and an exhaust fan. The grout chiller system is put into operation prior to the injection of LDCC 600 into the RPV 100 and can lower RPV 100 internal metal temperatures to <75° C. The LDCC 600 is prepared in batches on-site using special foaming agents and curing additives, pumped into the containment building and routed to proper RPV 100 injection ports. The density of the LDCC is within a safety range of 0.721 to 1.041 g/cm$^3$.

Prior to installing the shield plates 201, 202, the RPV 100 is allowed to vent and cool. In addition, closure plates, for example the drain closure plate 406, can be removed to verify that the RPV 100 includes a requisite amount of the LDCC 600, that there are no empty spaces in the RPV 100, and that no free standing water is in the RPV 100.

The two inch thick shield plate 201 is mechanically fastened around the main nozzles of the RPV 100. The 5 inch thick shield plate 202 is mechanically closed around the RPV 100. The 5 inch thick shield plate 202 can be mechanically closed around the RPV 100 by lowering the RPV 100 into a void enclosed around its circumference/perimeter by the 5 inch thick shield plate 202 and subsequently mechanically fastening the 5 inch thick shield plate 202 to the RPV 100. The mechanical fasteners are removed after the shield plates are welded as described below.

The shield plates 201, 202 are not welded to the RPV 100 so as to avoid exposing workers to high radiation doses and so that the integrity of the RPV 100 is not compromised. Two inch and five inch shield plate 201, 202 vertical seams are welded and then the five inch shield plate 202 is welded to the two inch shield plate 201 on the circumference as shown in FIG. 11. The shield plate material can be steel or the like.

As shown in FIG. 7, the RPV 100 may now be removed and placed on its side in preparation for removal and disposal. The final step is to transport the RPV 100 to a burial site by means of a barge or the like. The RPV 100 package can be buried in a trench or the like.

While this invention has been described in terms of specific embodiments, this invention, including this disclosure and appended claims, is not so limited and is to be construed in accordance with the full spirit and scope of the invention including alternatives and modifications made apparent to those of skill in the art.

What is claimed is:

1. A method of packaging a nuclear reactor vessel for decommissioning and removal, comprising the steps of:

installing reactor vessel closure plates onto the vessel;

injecting concrete into the vessel;

installing a first shielding ring around main nozzles of the vessel;

enclosing the vessel with a second shielding ring;

welding longitudinal seams of the first shielding ring;

welding longitudinal seams of the second shielding ring;

welding the second shielding ring to the first shielding ring;

placing the vessel on shipping cradles; and tightening a longitudinal restraint mechanism to the vessel.

2. The method of packaging a nuclear reactor vessel according to claim 1, wherein the concrete is wet, low density cellular concrete.

3. The method of packaging a nuclear reactor vessel according to claim 1, wherein the concrete has a density between 0.721 g/cm$^3$ to 1.041 g/cm$^3$.

4. The method of packaging a nuclear reactor vessel according to claim 1, further comprising the step of preparing the concrete on-site with foaming agents and curing additives.

5. The method of packaging a nuclear reactor vessel according to claim 1, further comprising the step of circulating air into the vessel to remove heat from inside the vessel.

6. The method of packaging a nuclear reactor vessel according to claim 5, wherein the step of circulating air into the vessel is performed prior to the step of injecting the concrete into the vessel.

7. The method of packaging a nuclear reactor vessel according to claim 1, further comprising the step of allowing the vessel to vent and cool.

8. The method of packaging a nuclear reactor vessel according to claim 1, further comprising the steps of:

removing the closure plates;

verifying that the vessel includes a requisite amount of the concrete;

verifying that there are no empty spaces in the vessel; and confirming that no free standing water is in the vessel.

9. The method of packaging a nuclear reactor vessel according to claim 1, wherein the first shielding ring is steel and is externally installed around the main nozzles of the vessel.

10. The method of packaging a nuclear reactor vessel according to claim 9, wherein the second shielding ring has substantially the same composition as the first shielding ring and is externally installed around a core area of the vessel.

11. The method of packaging a nuclear reactor vessel according to claim 1, further comprising the steps of:

lowering the vessel into the second shielding ring; and mechanically fastening the second shielding ring to the vessel.

12. The method of packaging a nuclear reactor vessel according to claim 1, further comprising the steps of:

using temporary mechanical fasteners to hold the first and second shielding rings in place; and removing the temporary mechanical fasteners after the first and second shielding rings are welded.

13. The method of packaging a nuclear reactor vessel according to claim 1, wherein the closure plates are welded to the vessel.

14. The method of packaging a nuclear reactor vessel according to claim 1, further comprising the step of installing impact limiters on each end of the vessel.

* * * * *